(12) United States Patent
Lalane

(10) Patent No.: US 11,641,176 B2
(45) Date of Patent: May 2, 2023

(54) METHOD FOR BUILDING A PROTECTIVE STRUCTURE AND KIT THEREFOR

(71) Applicant: MONKILOWATT, Toulouse (FR)

(72) Inventor: Jean-Marc Lalane, Toulouse (FR)

(73) Assignee: MONKILOWATT, Toulouse (FR)

( * ) Notice: Subject to any disclaimer, the term of this patent is extended or adjusted under 35 U.S.C. 154(b) by 0 days.

(21) Appl. No.: 16/966,580

(22) PCT Filed: Feb. 1, 2019

(86) PCT No.: PCT/FR2019/050233
§ 371 (c)(1),
(2) Date: Jul. 31, 2020

(87) PCT Pub. No.: WO2019/150055
PCT Pub. Date: Aug. 8, 2019

(65) Prior Publication Data
US 2021/0083618 A1    Mar. 18, 2021

(30) Foreign Application Priority Data

Feb. 1, 2018 (FR) ..................................... 1850853

(51) Int. Cl.
*H02S 20/23* (2014.01)
*F24S 25/20* (2018.01)
(Continued)

(52) U.S. Cl.
CPC .............. *H02S 20/23* (2014.12); *F24S 25/20* (2018.05); *E04B 2001/34389* (2013.01); *F24S 2025/014* (2018.05); *F24S 2025/6002* (2018.05)

(58) Field of Classification Search
CPC ..... H02S 20/23; F24S 25/20; F24S 2025/014; F24S 2025/6002; E04B 2001/34389
See application file for complete search history.

(56) References Cited

U.S. PATENT DOCUMENTS 9,221,136 B2 * 12/2015 Ansari .................... B23P 19/04
9,882,067 B2 *  1/2018 Britcher ................. H02S 20/30
(Continued)

FOREIGN PATENT DOCUMENTS

DE   102015121200 A1 *  6/2017   .............. F24S 20/50
JP      2017/175800 A      9/2017
(Continued)

OTHER PUBLICATIONS

English language abstract of WO2017/156848.
Machine translation of WO2017/156848.
English language abstract of JP 2017/175800.

*Primary Examiner* — Rodney Mintz
(74) *Attorney, Agent, or Firm* — Perman & Green, LLP

(57) ABSTRACT

A method and a kit for building a protective structure, the method and the kit including supplying a carrying structure, including a plurality of parallel carrying rails; supplying a group of panels, the panels being able to be engaged on and slide on the carrying rails; and transferring the panels from the storage position to a final position bearing on the carrying rails, by transferring at least one of the panels from the storage position to an insertion position on the carrying rails; using a transfer device lifting the at least one panel upward; placing the transferred panels one after the other bearing on the carrying rails; and moving the transferred panels along the carrying rails.

21 Claims, 9 Drawing Sheets

(51) Int. Cl.
*F24S 25/00* (2018.01)
*F24S 25/60* (2018.01)
*E04B 1/343* (2006.01)

(56) References Cited

U.S. PATENT DOCUMENTS

| | | | | |
|---|---|---|---|---|
| 10,367,442 B2* | 7/2019 | Ansari | ............... | H02J 7/0042 |
| 11,283,397 B2* | 3/2022 | Kunesh | ............... | F24S 20/50 |
| 2008/0264467 A1* | 10/2008 | Doko | ............... | F24S 20/50 |
| | | | | 136/245 |
| 2010/0000165 A1 | 1/2010 | Koller | | |
| 2012/0023728 A1* | 2/2012 | Britcher | ............... | B61B 5/02 |
| | | | | 254/2 R |
| 2012/0027550 A1* | 2/2012 | Bellacicco | ............... | H01L 31/18 |
| | | | | 414/547 |
| 2012/0279069 A1* | 11/2012 | Von Deylen | ............... | F24S 25/16 |
| | | | | 29/700 |
| 2013/0019925 A1* | 1/2013 | Britcher | ............... | H02S 20/30 |
| | | | | 136/251 |
| 2013/0133172 A1* | 5/2013 | Kiener | ............... | F24S 25/00 |
| | | | | 414/539 |
| 2013/0186450 A1 | 7/2013 | Smith | | |
| 2014/0231284 A1* | 8/2014 | Ansari | ............... | E04H 1/1238 |
| | | | | 29/428 |
| 2014/0360552 A1* | 12/2014 | Britcher | ............... | B65D 19/44 |
| | | | | 211/85.8 |
| 2016/0173025 A1 | 6/2016 | Baumgartner | | |
| 2018/0062572 A1* | 3/2018 | Kunesh | ............... | F24S 30/452 |
| 2018/0358919 A1* | 12/2018 | Ansari | ............... | H02S 10/12 |

FOREIGN PATENT DOCUMENTS

| | | | |
|---|---|---|---|
| WO | 2008/028677 A2 | 9/2007 | |
| WO | WO-2010118236 A1 * | 10/2010 | ............ F24J 2/5205 |
| WO | 2016/113287 A1 | 7/2016 | |
| WO | 2017/156848 A1 | 9/2017 | |
| WO | WO-2017156848 A1 * | 9/2017 | ............ A01G 9/249 |

* cited by examiner

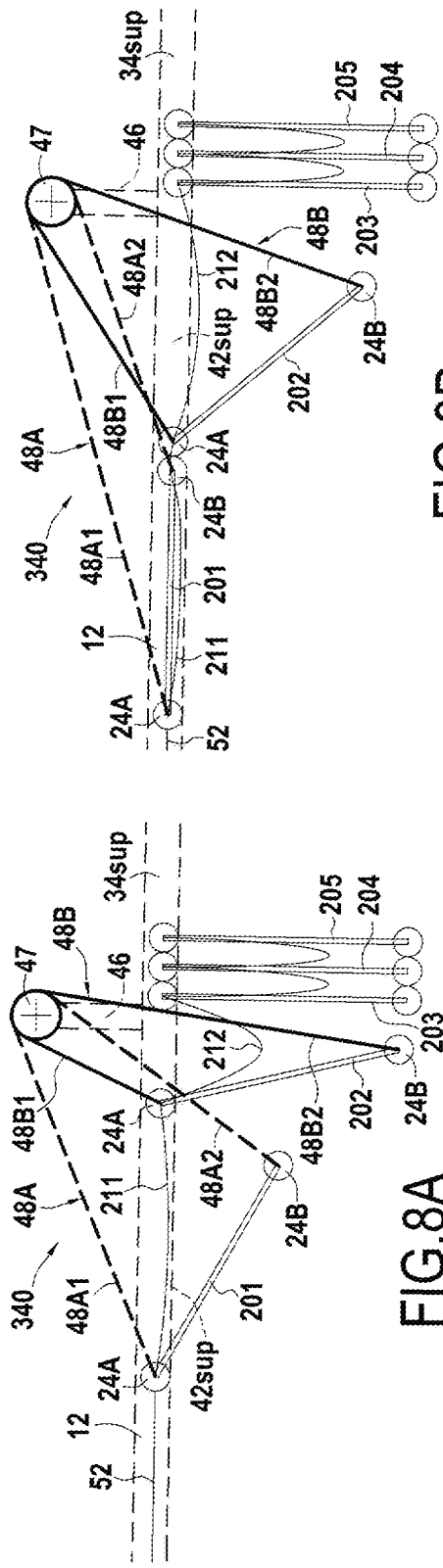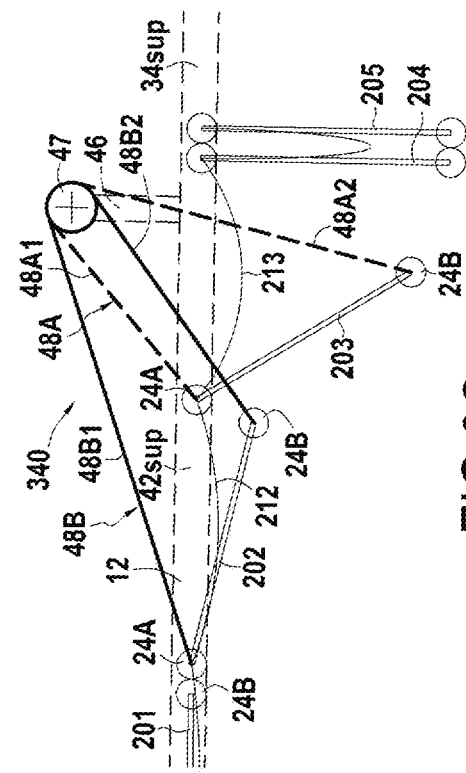

METHOD FOR BUILDING A PROTECTIVE STRUCTURE AND KIT THEREFOR

TECHNICAL FIELD

The invention relates to a method for building a protective structure, a kit for building a protective structure and by extension, the protective structure obtained from the building method. The invention relates specifically, but not solely, to the case where the panels of the protective structure are photovoltaic panels.

TECHNICAL BACKGROUND

In the present document, the expression "protective structure" denotes any structure comprising panels placed beside one another, in general horizontally, and which is thus able to form a shelter, or at least to provide a certain amount of protection. Specifically, the panels can provide more or less complete protection from rain, sun and other adverse weather conditions. The protective structure can for example be a building, or else at least a structure of a building. The expression "protective structure" does not imply that the panels are flush-fitted, and still less that they are sealed.

For example, there is known from the document WO2008028677 a solar roof composed of solar panels mounted on posts.

This roof advantageously has a considerable surface area and therefore makes it possible to form a protective structure with a large surface area. However, the building of this roof is relatively complex and the time needed to assemble it is considerable.

There is therefore a need for a building method and a building kit making it possible to build a protective structure simply and quickly.

This need particularly exists in the case where the roof of the protective structure thus built includes photovoltaic panels. The protective structure can then be connected to an electricity distribution network and/or to an electricity storage system to supply electricity.

SUBJECT AND SUMMARY OF THE INVENTION

A first aim of the invention is to propose a building method, making it possible to build a protective structure with a relatively large surface area simply and quickly.

This aim is achieved owing to a method for building a protective structure, comprising the following steps:

a) a carrying structure, including a plurality of parallel carrying rails, is supplied;

b) a group of panels, disposed parallel to one another in the storage position, is supplied;

the panels and the carrying structure being configured such that the panels can be engaged on the carrying rails and supported by them, and can then slide along them along a direction of assembly;

c) a transfer device is put in place;

d) the panels are transferred from the storage position to a final position wherein all of said panels are supported by the carrying rails, by performing the following operations in such a way as to transfer all the panels:

d1) at least one of the panels is transferred from the storage position to an insertion position wherein said at least one of the panels is bearing on the carrying rails;

the transfer being performed using the transfer device lifting said at least one of the panels upward;

the transferred panels being placed one after the other bearing on the carrying rails;

d2) at least one panel is moved along the carrying rails along the direction of assembly.

In step d2), several panels in place on the carrying rails can be grouped and moved together, forming a 'panel train'.

During step d), as a function of the mode of implementation chosen, steps d1) and d2) can according to the case be performed sequentially, or simultaneously (or partly simultaneously). Steps d1) and d2) are generally repeated, as many times as necessary. Moreover, the successive transfers of the different panels can partly overlap (in time). For example, the end of the transfer of a panel can occur at the same time as the start of the transfer of the following panel.

The expression "lifting a panel upward" here means moving the panel such that the center of gravity of the panel, at the end of the movement, is found at a greater height than at the start.

One or more of the panels can be photovoltaic panels. More generally, each of the panels can have any possible function: in particular the functions fulfilled by a roof: protection from bad weather, thermal, sound and/or sun-proof insulation etc.

A second aim of the invention is to propose a building kit, making it possible to build a protective structure with a relatively large surface area simply and quickly.

This aim is achieved owing to a kit for building a protective structure, comprising a container, a group of panels disposed parallel to one another in a storage position in the container, and a set of components making it possible to build a carrying structure including a plurality of parallel carrying rails, and a transfer device:

the panels and the carrying structure being configured such that the panels can be engaged on the carrying rails and supported by them, and can then slide along them along a direction of assembly; and the building kit is configured in such a way as to allow the transfer of the panels from the storage position to a final position wherein all of said panels are supported by the carrying rails, by performing the following operations in such a way as to transfer all the panels:

d1) transfer of at least one of the panels from the storage position to an insertion position wherein said at least one panel is bearing on the carrying rails;

the transfer being performed using the transfer device (40, 140, 240) lifting said at least one of the panels upward;

the transferred panels being placed one after the other bearing on the carrying rails; and d2) movement of at least one panel along the carrying rails along the direction of assembly.

The building kit is thus configured in such a way as to make it possible to build a protective structure by implementing the method for building a protective structure defined previously.

In addition, the building kit can be configured in such a way as to make it possible to build a protective structure by implementing any method for building a protective structure in accordance with the present disclosure.

The present disclosure also relates to a protective structure obtained from a building kit as defined above.

The protective structure obtained has a simple structure wherein a set of panels are disposed side by side on a carrying structure. The panels are carried by two carrying rails (or more) which serve during building to guide the panels until they reach their end position on the carrying structure, and which then serve as a support for the panels, where applicable in a permanent manner.

In an embodiment, said at least one panel is of generally rectangular shape; and in the insertion position and/or in the final position, or else continuously during the movement of said at least one panel in step d2) from the insertion position to the final position, each angle of said at least one panel rests directly or indirectly on the carrying rails via at least one bearing point located at a short distance from the angle under consideration.

The expression 'a short distance' here means a distance of less than 50%, and preferably less than 20%, of the length of the panel under consideration measured along the direction of assembly.

This disposition allows said one panel to bear in a stable manner on the carrying rails, while being supported by them both by its front side and its rear side.

In particular, according to the case, in the insertion position and/or in the final position, or in any intermediate position, said at least one panel is bearing on the carrying structure such that, even if no horizontal pull is applied to said at least one panel, said panel remains bearing in a stable manner on the carrying rails.

Preferably, the front side and the rear side of said at least one panel rest directly or indirectly on the carrying rails via a plurality of bearing points while transmitting to them alone a vertical force (resulting from the weight of the panels), but without a horizontal component.

Similarly, in a preferred embodiment of the method, after the building of the protective structure, the panels are held in the final position without any external horizontal force being applied to them.

In an embodiment, for said at least one panel, in the final position, a front side and/or a rear side of said at least one panel is/are bearing on the carrying rails, without said at least one panel bearing, even partly, on the side(s) under consideration, on one or more of the adjacent panels. The weight of the panel under consideration can be transmitted to the carrying rails directly or by way of supports.

Conversely, in an embodiment for said at least one panel, in the final position, a front side and/or a rear side of said at least one panel is bearing on the carrying rails via one or more adjacent panels.

The rear or front side of said at least one panel can thus be configured in such a way that, when the panel is in the final position on the carrying rails, it rests directly or indirectly (i.e. by way of a connector, or a linking part) on the adjacent panel(s).

In an embodiment, the transfer of the panels is done in such a way as to gradually form a panel train on the carrying rails. The expression "panel train" denotes a set of panels disposed one after the other, and thus able to move on the (carrying) rails like a train.

This panel train is formed gradually as the panels are transferred (one by one, or group by group) from the storage position to the insertion position. If for example the panels are transferred one by one, in an embodiment, after each transfer of a panel from its storage position to the insertion position (which is a constant position allowing the insertion of the panels on the carrying structure), the panel train (including the panel that has just been transferred) is moved along the direction of assembly, in such a way as to free up the insertion position on the carrying structure and thus to allow the transfer of the following panel into the insertion position.

The panels are structures in the shape of thin shells. They are generally substantially flat, but not necessarily. The panels are normally rigid, non-articulated panels.

The panels are normally rectangular in shape, with a front side, a rear side and two lateral sides. The front side of a panel is that which is at the front of the panel during its transfer to step d).

The panels can in particular be photovoltaic panels. A photovoltaic panel is a panel including one or more photovoltaic modules; a photovoltaic module being a component of generally flat shape capable of generating electrical energy from sunlight.

The panels can in particular be of large dimensions (more than four meters, or even five meters long), can weigh more than 75 kg, or even several hundred kg, then being too heavy to be transported by hand.

In the storage position, the panels are normally stored in a container.

A container here denotes any packaging appropriate for storage, in particular the storage of panels, in particular panels of parallelepipedal shape. The containers can in particular be standard containers for road or sea transportation, for example containers compliant with the ISO 6346 standard, in particular of 20 feet or 40 feet in length.

Preferably, in the storage position the panels are stored in the vicinity of the ground; for example in a container placed on the ground.

Owing to the transfer device, when the building method according to the invention is implemented, the panels are mechanically lifted by the transfer device to pass from their initial position, the so-called "storage position", to an intermediate position, the so-called "insertion position", wherein they are bearing on the carrying rails.

It will be understood that in the storage position, the center of gravity of a panel is at a lower height (altitude) than when the panel is in the insertion position bearing on the carrying rails.

Preferably, the carrying rails extend along a horizontal direction.

Advantageously, the transfer device, by lifting the panels, therefore makes most of the mechanical effort of transferring the panels from the storage position to the final position of the panels, on the carrying structure.

The method is therefore particularly suited to the case where the panels are stored at ground level, the container being placed on the ground, and wherein the carrying structure is built such that the carrying rails are located at a certain height about the ground, for example at least 1.7 meters or more preferably at least 2.2 meters above the ground.

When the carrying rails are located at such a height, it is possible to stand up under the protective structure obtained, the panels then forming the roof of the protective structure.

The implementation of the method as per the present disclosure does not present any difficulties. Each of the panels is transferred from the container (or at least, from its storage position) to an insertion position on the carrying rails; the panels are inserted onto the carrying rails, forming a sort of train, and slide along the carrying rails until they reach their final position on the carrying structure.

In an embodiment, the panels are placed on the carrying rails without being linked to one another. For example, in this case provision can be made for pushing the panels from the insertion position all the way to the final position on the carrying structure; this push can for example be done by pushing only on the last panel incorporated into the panel train. The panels can thus move under the effect of their own weight, if the carrying rails are sloping.

In another embodiment, in step d1), at the latest at the end of its transfer, said at least one transferred panel is hooked to the other panels of the panel train.

Thus, the different panels of the panel train are secured to one another on the panel train. As in the preceding case, the panels can be pushed to be moved from the insertion position to the final position. However, this embodiment also means makes it possible, simply by pulling on one of the panels, in particular the front panel, to move all the panels of the panel train along the carrying rails, to place them in the desired position on the carrying structure.

In an embodiment, adjacent panels are coupled two by two when they are incorporated into the panel train. For example, a front side or a rear side of at least one panel can be configured in such a way as to be able to transmit a pull to the following panel, directly or via a connector. The link between adjacent panels can serve to transmit a pulling or pushing force along the direction of the carrying rails. It can also serve to transmit a force along the vertical direction, as will be detailed further on.

Many possibilities can be envisioned as regards the transfer device.

In particular, while remaining within the context of the invention, a panel can be stressed (pulled, pushed, guided etc.) in different ways to pass from its storage position to its insertion position. In accordance with the invention, in the course of the transfer to step d1) the panel is placed in an insertion position, wherein the panel is placed behind the last panel of the panel train and thus incorporated into the panel train.

We will now consider the generic case of a so-called "first panel" panel, which is to be incorporated into the panel train, and of a "second panel", intended to be engaged on the carrying rails following the first panel.

To lead the second panel to place itself in the insertion position following the first panel, in a mode of implementation, a front side of the first panel, or a rear side of a panel placed on the carrying rails in front of the first panel is hooked to a front side of the second panel, in particular during the transfer and at the latest after the transfer of the first panel.

This operation can in particular be performed during the transfer and at the latest after the transfer of the first panel.

Due to this linking between the panel train or the first panel and the second panel, when the panel train including the first panel is moved on the carrying rails in step d2), the second panel is also subjected to a pull which obliges it to position itself behind the first panel.

In a variant of this mode of implementation, the panel train (which at this stage does not include the first panel) or a front side of the first panel is hooked to the front side of the second panel. Advantageously, this embodiment does not require a complicated trajectory for the first panel, or a complicated means of connection to the second panel. For example, a cable or more generally a non-extensible connector can be used to provide the link between the panel train or the front side of the first panel and the front side of the second panel.

In a variant of this mode of implementation, in step d), during the transfer of the first panel, a rear side of a first panel is made to pass near to a front side of the second panel, and a rear half of the first panel is linked to a front side of the second panel. This link is generally made with an appropriate connector. Once the connector is in place, it allows the first panel to draw the second panel. The connector can be put in place by hand or mechanically.

The connector between the panel train or the first panel and the second panel is configured such that, when the first and the second panel have been incorporated into the panel train, the second panel is disposed behind the first panel. Afterwards, if the panel train is pulled with the first panel, the second panel is drawn after the first panel.

Alternatively, in a mode of implementation of the present invention, in the storage position, the panels are stored in a zig-zag formation, and a front side of each panel is hooked to a rear side of the preceding panel.

To simplify the transfer of the panels from the storage position to the carrying structure, preferably provision can be made for transfer rails to support the weight of the panels of the container during their transfer from the storage position all the way to their insertion position on the carrying structure. The transfer rails can be horizontal or not; in the latter case, they serve to compensate or take up a height difference between the height of the panels in the storage position and the height that they reach once disposed on the carrying structure.

The use of transfer rails is particularly effective when the panels are stored in bearing on storage rails.

For example, in an embodiment, the panels are supplied in step a) stored in a container including storage rails, and in the storage position are bearing on these storage rails, and the transfer device includes transfer rails.

In this case, while the transfer device is being put in place in step c), the transfer rails are disposed such that the transfer rails link the storage rails to the carrying rails; and during the transfer of said at least one panel from the storage position to the final position, said at least one panel is moved while being continuously supported successively by the storage rails, the transfer rails and the carrying rails.

In an embodiment, while the transfer device is being put in place in step d), the transfer rails, or part of the transfer rails, are disposed in an inclined position.

Afterwards, the transfer device makes it possible, using the inclined transfer rails, to hoist the panels such that the top of the panels is higher in the final position than in the storage position.

In an embodiment, the panels can be directly bearing on the storage rails, the transfer rails, and/or the carrying rails (for example by having the lateral sides of the runners made of polyethylene, or even of Teflon).

In another embodiment, the panels can include supports allowing them to move on the rails. These supports can in particular include wheels allowing the panels to roll on the carrying rails, and where applicable on the storage rails and optionally the transfer rails.

In this case for example, a front side and/or a rear side of at least one panel can include supports; said panel is supported by these supports, cooperating according to the position of the panel with the storage rails, the transfer rails and/or the carrying rails; said supports are configured to allow said panel to move by sliding with respect to the storage rails, the transfer rails and/or the carrying rails.

Preferably, during the step d1) of transfer from the storage position to the insertion position, all the panels make a motion consisting in an initial motion of placement in an initial position, then a main motion from the initial position to the insertion position; the initial motion from the storage position to the initial position being either a translation or a rotation, and the main motion being the same for all the panels. The initial motion can for example be a translation of the panel considered along the storage rails.

The main motion includes necessarily at least one movement of the center of gravity of the panel.

In an embodiment, the main motion is formed by the simultaneous, partly simultaneous, or successive combination of a vertical upward motion and a motion in a horizontal direction.

The main motion of the panels can further include one or more rotations. In this case, these rotations are preferably rotations with respect to one and the same fixed direction and in the same direction of rotation, or preferably a single rotation with respect to a fixed direction. This fixed direction is preferably parallel to an axis (longitudinal or transverse) of the container.

Once the panels are in the insertion position, their motion can simply be a translation.

Thus in an embodiment, in step d2), said at least one panel is moved along the carrying rails such that said at least one panel undergoes a translation along the direction of assembly.

The panels must be held in position throughout the different steps, not only of the building of the protective structure, but also preferably once the protective structure has been built.

Accordingly in an embodiment, a front or rear side of at least one panel includes holding supports, configured such that, when a panel is engaged on the carrying rails, said front side and/or rear side of the panel thus engaged is held by said holding supports; the holding supports engaging the carrying rails in such a way as to prevent a relative motion of said front side and/or of said rear side of the panel thus engaged with respect to the carrying rails downward and/or upward.

The holding supports can in particular bear on the carrying rails at bearing points located in the vicinity of the ends of the panel to ensure the stability thereof.

Owing to these holding supports, the front side and/or rear side of the panel can be held in the desired height position.

In an embodiment, in the insertion position and/or in the final position, or else continuously during the movement of said at least one panel in step d2) from the insertion position to the final position, a part of said at least one panel is disposed under a fly-off prevention part of a carrying rail. The panel is thus prevented, in particular, from flying off when it is windy. The fly-off prevention part can also serve as protection against the penetration of dust or sand into the carrying rails.

The holding supports must allow the panel to slide or move with respect to the carrying rails during the transfer of the panels; they are therefore different from locking bolts that would be attached at the end of the assembly. For example, the holding supports can comprise a wheel or a carriage or a skid.

In particular, the holding supports can be configured to allow the panel(s) to be moved in the opposite direction to the direction of assembly, to make it possible to fold or dismantle the structure, and for example to put the panels back in the container.

When a panel is supported by holding supports both on its front side and its rear side, these supports allow the panel to remain in the stable horizontal position on the carrying structure. It can stay in this stable position even when no pull is applied to the panels.

The shape of the rails can be optimized in different ways.

In an embodiment, the carrying rails are profiles of constant section. Thus advantageously, they are essentially made without remachining. While keeping a constant section, the rails can include a few local openings or alterations, for example to allow the attachment of the rails to posts, or other means.

They can in particular be formed by profiles, the section of which has the general shape of the letter 'C'.

They can in particular include an upper wall, which extends in a horizontal plane, to prevent the penetration of dust or sand into the rail.

The rails can include openings on the bottom part, to facilitate the egress and evacuation of dust and sand from the rail.

In a preferred embodiment, the holding supports include wheels, and the carrying rails and the wheels are configured so that the wheels are engaged inside the rails in the insertion position, then roll until the panel reaches the final position.

As has been previously indicated, the transfer device is disposed in such a way as to be able to lift the panels to allow their transfer to the carrying rails.

The lifting of the front (or rear) side of the panels can in particular be done by tension applied by cables. Alternatively, the lifting of the panels can result from the bearing of the panels (direct or indirect) on one or more of the bearings secured to the carrying structure (or of the ground).

This upwards movement of the different panels can be in different ways, in particular according to the position of the panels in the storage position.

In a mode of implementation, in the storage position, the panels are disposed horizontally on top of one another, forming a stack, and the front sides of the panels are disposed on a lateral side of the group of panels.

Preferably in this case, the transfer device includes an elevator, configured to lift the stack of panels. The term 'elevator' here denotes any apparatus capable of lifting the stack of panels.

In a particularly advantageous mode of implementation, the elevator is configured to lift the stack of panels under the effect of a pull applied to the panel train (in step d2)). The elevator can for example include a cable which serves to lift the tray on which the group of panels is resting, and which is linked to the cable exerting the pull serving to move the panel train. Consequently, simply by applying a pull to one of these cables, it is possible to transfer the panels from the storage position to the insertion position and move the panel train in such a way as to place the panels in the final position on the carrying structure.

In an embodiment, the transfer device is disposed such that the stack of panels is lifted by moving in upward vertical translation starting from the storage location of the panels in the container. In this case, advantageously the initial movement of the panels is simply a vertical translation, without rotation or horizontal movement.

Alternatively, in the storage position the panels are disposed vertically side by side, and the front sides of the panels are disposed on an upper side of the group of panels.

When the panels are stored in the vertical position, they must pivot to be placed in the insertion position, bearing on the carrying rails. This pivoting or rotation motion must be made while bearing on the carrying structure.

Thus in an embodiment, the transfer device includes a bearing secured to the structure; and during step d), at least one panel comes into contact with said bearing which forces said at least one panel to be lifted.

The bearing can take different forms: inclined ramps, pulleys attached to the structure, acting on cables linked to the panels etc. The bearing indicated here is naturally separate from the carrying rails (presents bearing surfaces which are not those of the carrying rails). The bearing can comprise one or more horizontal bearing bars, in particular rotary, inclined rails etc., separate from the carrying rails.

The bearing forming the carrying structure is configured such that, when a panel is moved in step c) (in particular, is moved horizontally), the panel comes into contact with the bearing, receives a reaction force from the bearing directed at least partly upward, which obliges the panel to be lifted and to gradually reach the desired height, in the insertion position.

For example in an embodiment the bearing includes at least two inclined ramps; a front or rear side of at least one panel includes at least two supports; the panel and the ramps are configured such that during the transfer of the panel, said at least two supports of the panel bear respectively on said at least two ramps, thus forcing the panel to be lifted. The supports can comprise wheels for rolling on the inclined ramps.

In an embodiment, the carrying rails include a first rolling surface for front support wheels of a panel; a second rolling surface for rear support wheels of a panel; an insertion opening to make it possible to position the rear wheels of the panel on the second rolling surface; and in step c), during the transfer of at least one panel, the rear wheels roll on said ramps, then roll on said second rolling surface, passing through the insertion opening the moment they pass from a surface of the ramp to the second rolling surface.

It is particularly advantageous to combine this embodiment with the embodiment mentioned previously wherein the container further includes two storage rails and the kit includes two transfer rails, the kit being configured such that during its transfer, a panel can be successively supported by the storage rails, the transfer rails and the carrying rails. In this case, the front side of the panel rests by its front supports on the storage rails; the front wheels roll on the storage rails, the transfer rails, and the first rolling surface of the carrying rails. On the rear side, the rear supports of the panel are lifted when the rear wheels make contact with the inclined ramps; the rear wheels roll on the ramps then on the second rolling surface.

The front end of the panel train, or at least the front side of one (or preferably of all the) panel(s) of the panel train can be drawn by a cable or cables in the direction of assembly. Thus in an embodiment, in step d2) the panel train is moved using a hoist; and in step d1), the transfer device is actuated by means of the hoist.

The kit for building a protective structure can have all or part of the following features. All or a part of these features can in particular be combined with one another, insofar as this combination is technically achievable.

The building kit can thus be configured such that:

said panels are of generally rectangular shape; and in the insertion position and/or in the final position, or else continuously during the movement of said at least one panel in step d2) from the insertion position to the final position, each angle of said at least one panel rests directly or indirectly on the carrying rails via at least one bearing point located at a short distance from the angle under consideration.

in the final position, a front side and/or a rear side of said at least one panel is/are bearing on the carrying rails, without said at least one panel bearing, even partly, on the side(s) under consideration, on an adjacent panel.

in the final position, a front side and/or a rear side of said at least one panel is/are bearing on the carrying rails via one or more adjacent panels.

the carrying rails, once assembled, extend along a horizontal direction.

the panels are supplied in step a) stored in a container including storage rails, and in the storage position, are bearing on these storage rails; the transfer device includes transfer rails; while the transfer device is being put in place in step c), the transfer rails are disposed such that the transfer rails link the storage rails to the carrying rails; and during the transfer of said at least one panel from the storage position to the final position, said at least one panel is moved while being continuously supported successively by the storage rails, the transfer rails and the carrying rails.

while the transfer device is being put in place in step d), the transfer rails are in the inclined position.

during the step d1) of transfer from the storage position to the insertion position, all the panels make a motion consisting in an initial motion of placement in an initial position, then a main motion from the initial position to the insertion position; the initial motion from the storage position to the initial position being either a translation or a rotation, and the main motion being exactly the same for all the panels.

in step d2), said at least one panel is moved along the carrying rails such that said at least one panel makes a translation along the direction of assembly.

a front side of a first panel is hooked to a front side of a second panel intended to be engaged on the carrying rails following the first panel, in particular during the transfer and at the latest after the transfer of the first panel.

in step d), during the transfer of a first panel, a rear side of a first panel is made to pass near to a front side of a second panel intended to be engaged on the carrying rails following the first panel, and a rear half of the first panel is linked to a front side of the second panel.

a front or rear side of at least one panel includes holding supports, configured such that, when a panel is engaged on the carrying rails, said front side and/or rear side of the panel thus engaged is held by said holding supports; the holding supports engaging the carrying rails in such a way as to prevent a relative motion of said front side and/or said rear side of the panel thus engaged with respect to the carrying rails downward and/or upward.

in the insertion position and/or in the final position, or else continuously during the movement of said at least one panel in step d2) from the insertion position to the final position, a part of said at least one panel is disposed under a fly-off prevention part of a carrying rail.

the carrying rails are profiles of constant section.

the transfer device includes a bearing secured to the structure; and during step d), at least one panel comes into contact with said bearing which forces said at least one panel to be lifted. Preferably, said bearing can include at least two inclined ramps; a front or rear side of at least one panel includes at least two supports; the panel and the ramps are configured such that during the transfer of the panel, said at least two supports of the panel respectively bear on said at least two ramps, thus forcing the panel to be lifted.

in the storage position, the panels are disposed horizontally on top of one another, forming a stack, and the front sides of the panels are disposed on a lateral side of the group of panels.

the transfer device includes an elevator, configured to lift the stack of panels.

the kit is configured such that in the insertion position, said at least one transferred panel is hooked to the other panels of the panel train.

a front side or a rear side of at least one panel is configured in such a way as to be able to transmit, directly or via a connector, a pull to the following panel.

the building kit is configured such that, during the transfer or at the latest after the transfer of at least a first panel that is to be incorporated into a panel train, the panel train or the first panel is hooked to a front side of a second panel intended to be incorporated into the panel train following the first panel.

the panel train or the first panel is hooked to the front side of the second panel, in particular by a non-extensible connector;

the building kit further comprises a connector configured to link a rear half of the first panel to the front side of a second panel configured to be incorporated into the panel train following the first panel, the kit being configured in such a way as to allow, during the transfer of the first panel, the rear side of the first panel to pass near to the front side of the second panel, and the connector is then put in place in such a way as to link the rear side of the first panel to the front side of the second panel.

said panel includes supports on its front side, including wheels, so-called front wheels; and supports on its rear side, including wheels, so-called rear wheels; the carrying rails include a first rolling surface for the front wheels, a second rolling surface for the rear wheels, and an insertion opening; the kit is arranged such that the rear wheels, during the transfer of said panel, roll on said ramps, then roll on said second rolling surface, passing through the insertion opening the moment they pass from one surface of the ramp to the second rolling surface.

a rear or front side of at least one panel is configured in such a way, when the panel is engaged on the carrying rails, as to rest directly or indirectly on an adjacent panel, in such a way as to be held in position along the vertical direction by said adjacent panel.

the building kit includes a hoist, and the hoist and the transfer device are configured such that, to transfer at least the panels other than the front panel, the transfer device is actuated by means of the hoist.

A protective structure in accordance with the present disclosure therefore comprises a carrying structure including a plurality of parallel carrying rails, and a group of panels engaged on the carrying rails and supported by them; the panels being placed one after the other bearing on the carrying rails. The carrying structure can have all or part of the features previously indicated (unless it is technically impossible). The panels of the carrying structure, at the time of assembly, are configured to be capable of sliding along the carrying rails along a direction of assembly. However, after the assembly, they can be locked in a fixed position and thus lose their ability to slide along the carrying rails.

BRIEF DESCRIPTION OF THE DRAWINGS

The invention will be clearly understood and its advantages will become more apparent on reading the following detailed description, of embodiments shown by way of non-limiting example. The description refers to the appended drawings, wherein:

FIGS. 8A, 8B and 8C are three schematic views in partial longitudinal section of a protective structure in the process of being built, in a fifth mode of implementation of the invention, in three successive steps of its building.

DETAILED DESCRIPTION OF THE INVENTION

Figure 1A:
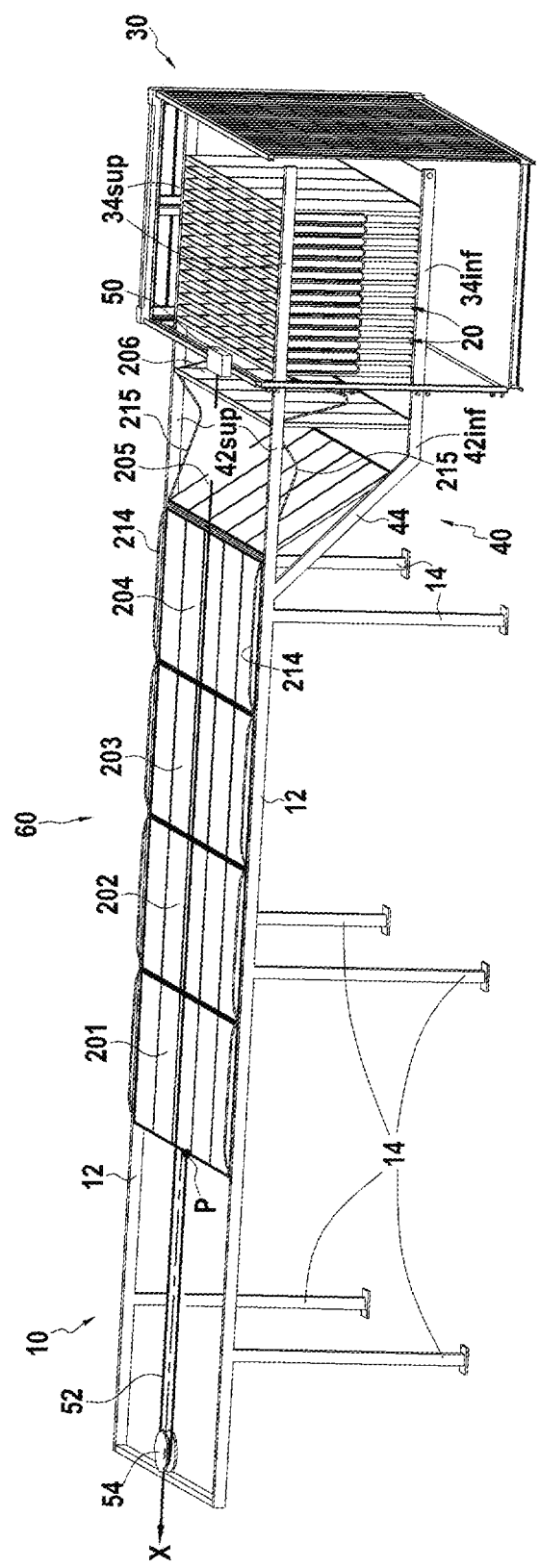
FIG. 1A is a schematic partial perspective view of a protective structure in the process of being built, according to a first mode of implementation of the invention.

For the sake of simplicity, elements having substantially the same function and/or the same structure in the different modes of implementation that will be presented bear the same reference signs.

The building of a protective structure according to a first mode of implementation of the invention will now be presented in relation to FIGS. 1A-1E, 2, 3 and 4.

The protective structure is assembled by transferring panels 20 gradually from a container 30 all the way to a carrying structure 10. The transfer is done by moving the panels along a horizontal axis of assembly X, starting from the moment when the panels are placed bearing on the carrying structure.

Although this will not be further detailed below, all the components implemented are symmetrical with respect to the vertical plane containing the axis of assembly X.

The main constituents of the protective structure are a carrying structure 10 and panels 20. The panels are collectively referred to as panels 20; they are also individually referenced as panel 201, panel 202, etc.

The carrying structure 10 can be made in many ways: it can be a metal, wooden, inflatable, composite structure etc.

In the example presented the structure is metal, and is mainly formed by a set of rails assembled together, in a manner known per se.

These rails mainly divide into two carrying rails 12, supported by a certain number of vertical posts 14 attached to the ground.

The carrying rails 12 are mutually parallel metal profiles, disposed horizontally. In other embodiments, there can be three parallel carrying rails, or even more. The carrying rails 12 in particular have the function, when the panels are in the final position on the structure, of holding the panels in place and supporting the weight of the panels, and preventing them from flying off.

In addition, as will be explained, the carrying rails 12 serve to guide and support the panels 20 during their transfer to the final position.

In the present case, provision is made for the rails 12 at the lateral ends of the panels; they could also be found at intermediate positions along the width of the panels (the width is measured along the direction perpendicular to the direction of assembly X shown in FIG. 1A).

In other embodiments, provision can be made for an additional carrying rail at mid-distance between the lateral ends of the panels, to reduce the cantilever.

The panels 20 are rectangular photovoltaic panels.

Initially, at the beginning of the building of the protective structure, all the panels 20 are disposed mutually parallel in a container 30, in the storage position. The container 30 is a container having standard dimensions and external features for road, sea or rail transportation.

In the container 30, the panels are disposed vertically (the direction perpendicular to the panels is horizontal; more precisely, it is oriented along the direction of assembly X). The sides of the panels which are intended to be disposed on the front side (along the direction of assembly X) are disposed at the top (on the upper side of the panels).

The container 30 includes four storage rails, namely two upper storage rails 34sup, and two lower storage rails 34inf.

In this example, all the panels 20 are identical.

Figure 2:
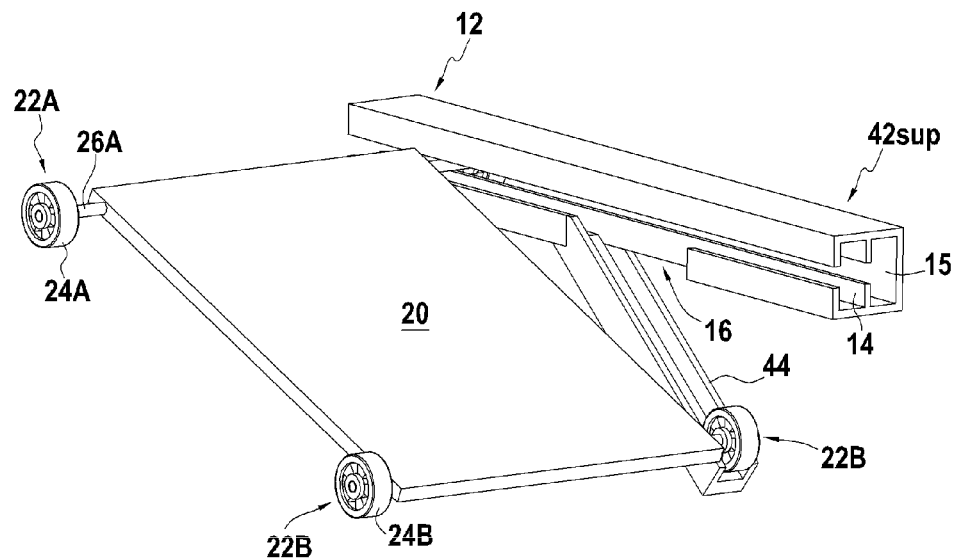
FIG. 2 is a schematic partial perspective view of a panel in the process of being assembled, bearing on a ramp and rails used for the building.
Figure 3:
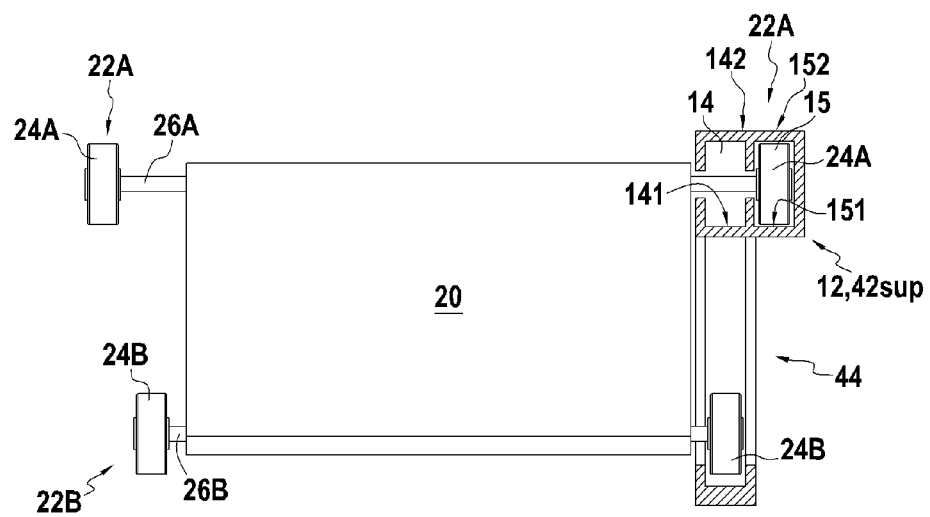
FIG. 3 is a section in a vertical plane of the elements shown in FIG. 2.

Each panel 20 is equipped with four supports 22, namely two front supports 22A and two rear supports 22B (FIG. 2, 3). Each support 22 mainly comprises a wheel (front wheels 24A, rear wheels 24B) and a hub attached to the panel 20. The two wheels 24A of the supports 22A are linked by a shaft 26A attached to the front of the panel 20 which forms the hub shared by the two front wheels 24A. The two wheels 24B of the supports 22B are linked by a shaft 26B attached to the rear of the panel 20 which forms the hub shared by the two rear wheels 24B.

Naturally, other types of support can be chosen as supports for the panels 20: carriages each including several wheels, skids configured to slide in or on the carrying rails, etc.

In the container 30, the front side of each of the panels is linked to the front side of the panel which follows it by two cables (one cable on the left side, one cable on the right side). These cables are collectively referred to as cables 21; they are also referenced by pairs: cables 211 for the panel 201, cables 212 for the panel 202, etc.

Each of the carrying rails 12 is a metal profile of constant section, having the general shape of the letter 'C' to allow the wheel shafts to pass over a lateral face. The section of these rails has two wheel passages 14, 15. The lower part of these wheel passages 14 and 15 respectively includes a first rolling surface 141 and a second rolling surface 151.

Each of the wheel passages 14, 15 is closed toward the top by a horizontal wall (142, 152 respectively). The walls 142 and 152 jointly form a fly-off prevention part of the carrying rails 12, insofar as they prevent the wheels 24A, 24B from moving upward (except for a certain amount of play naturally), and thus prevent the panels from moving upward, and thus flying off if a gust of wind lifts them.

The storage rails 34sup, 34inf have the same section as the carrying rails 12.

When the protective structure is built, as soon as the panels are placed in the insertion position, their wheels 24A, 24B are bearing on the rolling surfaces 151 and 141 respectively. Thus, the four angles of each panel are bearing (via the wheels 24A, 24B) on the carrying rails 12, whether in the insertion position, in the final position, and at each instant during the movement of the panels from the moment that they are in the insertion position. Owing to these bearings at the four angles, in these different positions the front side and the rear side of the panels rests on the carrying rails 12 via bearing points which are the bearing points of the wheels 24A, 24B on the rolling surfaces 151 and 141.

The transfer of the panels 20 from the container 30 to the carrying structure 10 is done using a transfer device 40.

The transfer device 40 mainly includes transfer rails 42sup and 42inf, two ramps 44 and a hoist 50.

The transfer rails 42sup and 42inf are rails having the same section as the carrying rails 12.

The transfer rails 42sup are disposed at the same height as the carrying rails 12 and the storage rails 34sup. They continuously link the storage rails 34sup to the carrying rails 12.

The transfer rails 42inf are disposed at the height of the lower sides of the panels; thus in the storage position, the rear wheels 24B of the panels are found in the wheel passages of the transfer rails 42inf.

The transfer device 40 further includes a hoist 50, attached at the top part of the container 30 and equipped with a cable 52 exerting a pull.

Figure 4:
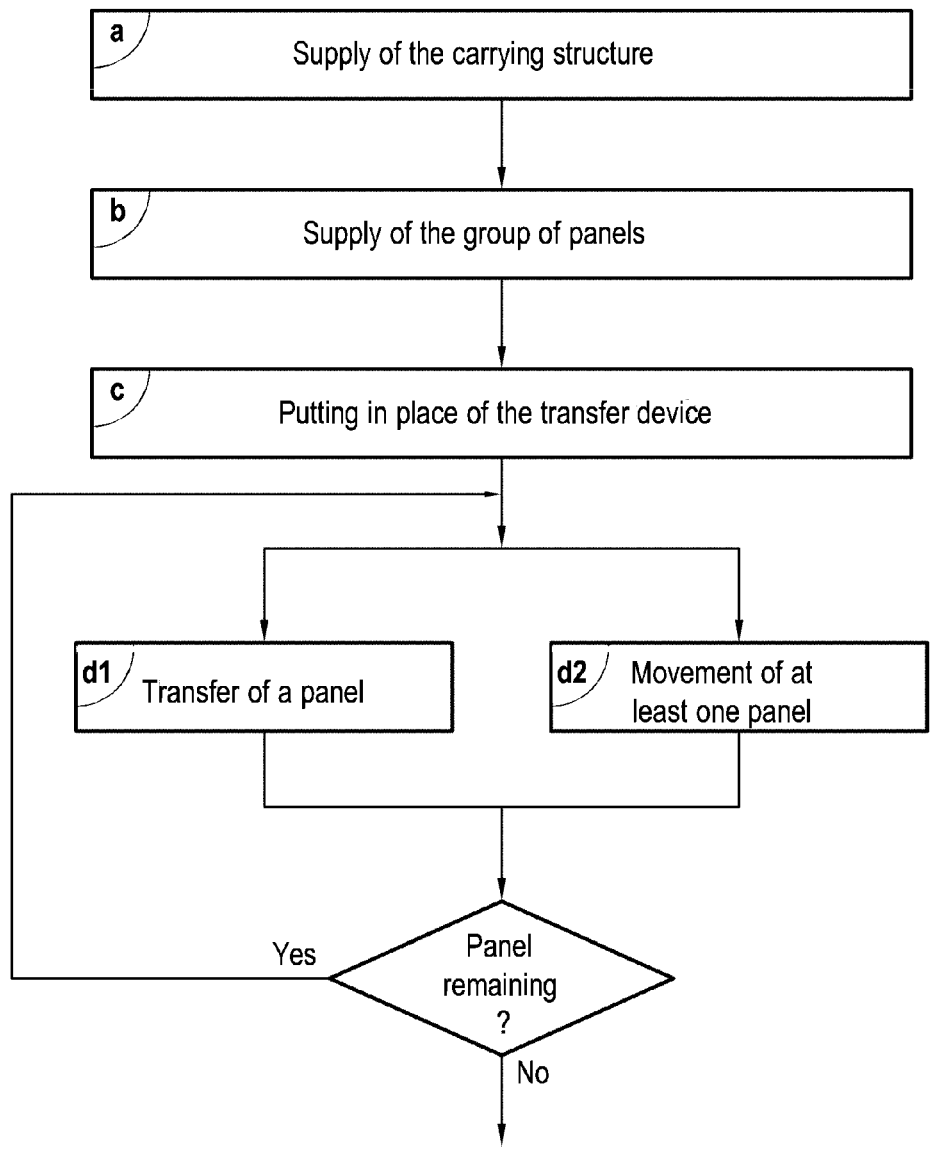
FIG. 4 is a diagram illustrating the different steps of a mode of implementation of the building method according to the invention.

The different steps of the method for building the protective structure will now be presented in relation to FIGS. 1A-1E, 2 and 3 and the diagram of FIG. 4.

In step a), the carrying structure 10 is built from its different components.

In step b), the container 30 is supplied, containing the panels 20 shelved vertically side by side in the container 30. Each of the panels 20 is bearing both on its rear supports 22B (the rear wheels 24B are disposed in the first wheel passages 14, bearing on the rolling surfaces 141 of the lower storage rails 34inf) and the front supports 22A (the front wheels 24A are disposed in the second wheel passages 15, bearing on the rolling surfaces 151 of the upper storage rails 34sup).

In step c), the transfer device 40 is put in place.

In step d), the panels 20 are transferred from their storage position in the container 30 to a final position wherein all the panels are supported by the carrying rails 12.

This transfer is done by performing (optionally iteratively) the following operations in such a way as to transfer all the panels 20:

d1) one of the panels 20 is transferred from the storage position to an insertion position wherein the panel under consideration is bearing on the carrying rails 12;

d2) simultaneously, the panels already bearing on the carrying rails are moved along them, along the direction of assembly X.

The transferred panels are placed one after the other bearing on the carrying rails 12 and little by little form a panel train 60 bearing on the carrying rails 12.

At the start of step c), the cable 52 of the hoist 50 is deployed such that the cable 52 passes through a return pulley 54 attached to the front of the structure 10, and comes back to a fastening point P located in the middle of the front side of the first panel 201. Using the hoist 50, the front panel 201 is pulled using the cable 52. Under the effect of the pull that is applied to it, the front panel 201 puts itself in place on the carrying rails 12 in the engaged position. It then forms the first element of a "panel train" 60 which will gradually be formed to make the protective structure.

Once the front panel 201 has been put in the insertion position, the following panels are all assembled in the same way.

The transfer of a panel 202 (by way of example) from its assembly position to its insertion position at the rear of the panel train (step c1) will now be explained in relation to FIGS. 1B-1E. These figures show four successive times t1, t2, t3 and t4 of the transfer of the panel 202 from its storage position to its insertion position on the carrying structure 10.

Figure 1B:
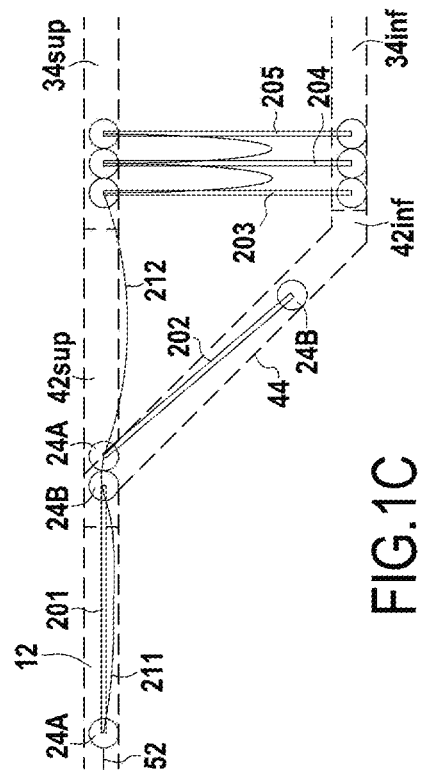
FIGS. 1B, 1C, 1D and 1E are four schematic views in partial longitudinal section of the protective structure of FIG. 1A, in four successive steps of the building.

Time t1 (FIG. 1B)

At the time t1, the transfer of the panel 201 from its storage position to its insertion position is almost finished; conversely, the transfer of the panel 202 is beginning.

At this stage, the panel 202 has just separated from the panel 203 (which is still in the storage position). The front side of the panel 202 is drawn by the cables 211, which are fastened on the front side of the panel 201. Under the effect of this pull, the front side of the panel 202 moves forward (in the direction of assembly X).

The front wheels 24A of the panel 202 after having briefly rolled on the upper storage rail 34*sup* are now bearing on the transfer rail 42*sup*; and the rear wheels 24B of the panel 202 after having briefly rolled on the lower storage rail 34*inf* and having passed onto the transfer rail 42*inf*, have just become engaged on the ramps 44. The cables 212 linking the front side of the panel 202 to the front side of the panel 203 are not yet taut.

Figure 1C:
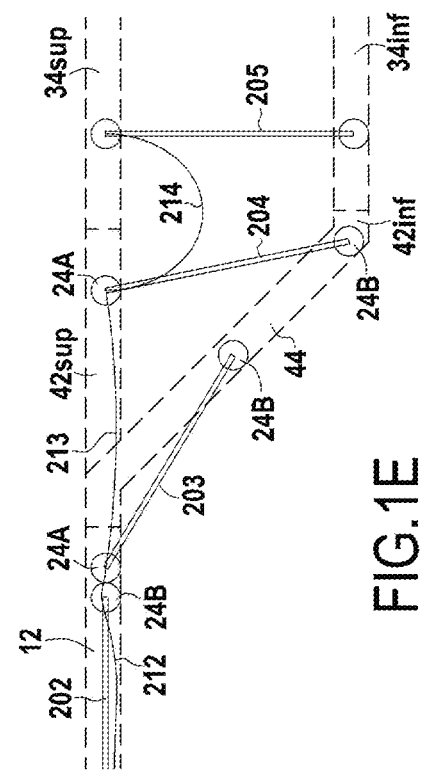

Time t2 (FIG. 1C)

The rear wheels 24B of the panel 201 have just passed through the insertion openings 16 (FIG. 2) for which provision has been made on the lower face of each of the transfer rails 42*sup* and are now bearing on the rolling surfaces 141 of the first wheel passages 14. The panel 201 has therefore reached its insertion position, bearing on the carrying rails 12.

The transfer of the panel 202 toward its insertion position is in progress. In the course of this motion, the panel 202 is lifted by the transfer device 40, due to the fact that its rear wheels 24B are elevated by rolling on the ramps 44 which rise toward the rails 12, whereas its front wheels 24A roll forward (along the direction of assembly X) in the second wheel passage 15 of the rails 42*sup*.

During the transfer of the panel 202, the cables 212 linking the front of the panel 202 to the front of the panel 203 gradually tauten. As soon as they are taut, the panel 203 begins to move forward (in the direction of assembly X, FIG. 1A); its front/rear wheels first roll along the storage rails 34*sup*/34*inf*, then along the transfer rails 42*sup*/42*inf*.

Figure 1D:
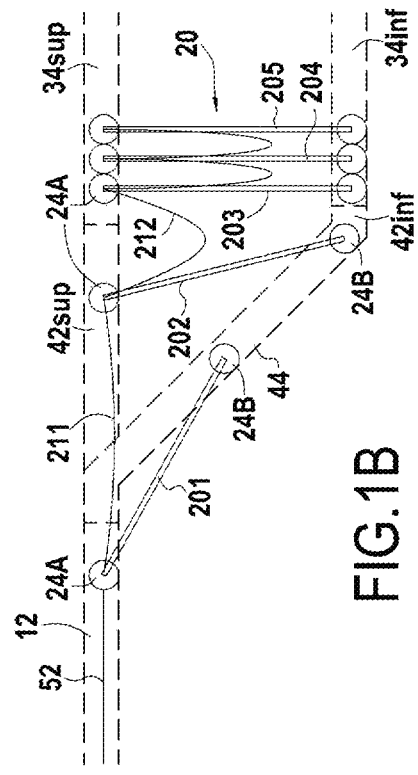

Time t3 (FIG. 1D)

The front panel 201 (which at this stage forms the panel train 60) continues to be drawn forward using the hoist 50, via the cable 52.

The panel 202 is on the point of reaching its insertion position, its rear wheels 24B rise again on the ramps 44 but have not yet passed through the openings 16 and are not yet in the first wheel passage 14 of the carrying rails 12.

The panel 203 is in the process of being transferred, under the effect of the pull that is applied to it by the cables 212; its rear wheels have just become engaged on the ramps 44.

The panel 202, then behind it the panel 203, pivot little by little in the course of their respective transfers, while elevating, and gradually and successively put themselves in the horizontal position at the level of the carrying rails 12.

Figure 1E:
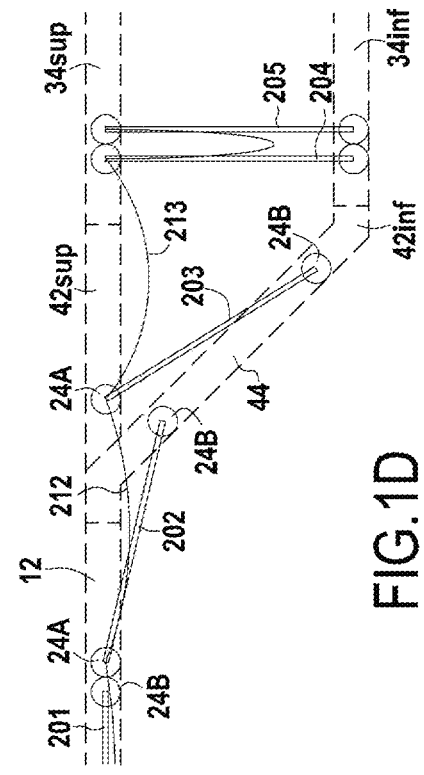

Time t4 (FIG. 1E)

The panel 202 has just gone past its insertion position and is now incorporated into the panel train 60. The latter is therefore at this stage formed by the panels 201 and 202, and moves along the direction of assembly X. Just behind the panel 202, the panel 203 has performed most of its transfer, and the panel 204 has itself begun to move under the effect of the pull that is applied to it by the cables 213.

In the course of its transfer, the panel 202 moves only under the effect of the pull that is applied to it by the cables 211 (it being noted that its wheels 24A and 24B remain bearing at all times on the storage rails, the transfer rails, the carrying rails and/or the ramps, according to the case).

The length of the cables 21 is computed such that in the insertion position, the front side of a panel 20 is just behind the rear side of the preceding panel 20. The cables 21 form connectors within the meaning of the invention and are formed from a non-extensible material (metal for example).

In this mode of implementation, the operations d2) of movement of the panel train 60 and the operations d1) of transfer of the panels 20 occur at the same time. During the transfer of a panel 20 from its initial position to its insertion position, the panel train 60 moves by substantially the length of one panel (along the direction of assembly X).

All of the panels 20 are thus successively drawn out of the container 30 and placed in the insertion position. Each panel 20, as soon as it reaches its insertion position, may be considered as being incorporated into the 'panel train' 60. It is then gradually moved forward as the hoist 50 pulls the cable 52.

As the wheels 24A, 24B of each of these panels 20 roll on the rails 12, the panels of the train 60 can move easily along the rails 12 along the direction of assembly X.

Thus, under the effect of the pull, all of the panels 20 are successively taken out of the container 30 and placed in the final position on the carrying structure 10.

Advantageously, the operations of assembly of the panels are reversible. It is thus possible to dismantle the protective structure easily and quickly by performing the reverse operations of the operations d1) and d2).

The supports 22 of the panels serve both as means for supporting the panels in the storage position in the container 30 and means for supporting and guiding, during the transfer of the panels 20 from their storage position to their insertion position and all the way to their final position on the structure 10.

In addition, the supports 22 also serve as supports for holding the panels. Specifically, when a panel 20 is engaged on the carrying rails 12, as the wheels 24A and 24B respectively are compelled to move only along the direction X through the wheel passages 14 and 15 of the carrying rails 12, this prevents (except for the play) any forward or rearward motion of the panels downward and upward with respect to the carrying rails 12.

In this position, owing to the supports 22 resting directly on the rails 12, the front side and the rear side of the panels are bearing on the carrying rails 12, but without the panel 20 bearing, even partly, either on the front side or the rear side, on an adjacent panel.

The building of a protective structure according to a second mode of implementation of the invention will now be presented in relation to FIGS. 5A to 5D.

This mode of building is quite similar to the mode of building presented previously. Hence, unless otherwise specified, it should be considered that the second mode of implementation is identical to the first mode of implementation.

In this mode of implementation, the panels 20 are stored horizontally in the container 30 and form a stack of panels 200.

The panels 20 in this mode of implementation are slightly different from the panels 20 of the first mode of implementation.

In the present case, each of the panels 20 includes front supports 22A which are identical to the front supports 22A of the first mode of implementation.

On the other hand, the rear side of each of the panels 20 includes specific supports 22B, which are formed by hooks, collectively referred to as hooks 22. Each panel 20 thus includes two hooks attached at the two ends of its rear side. (The panel 201 includes two hooks 221, the panel 202 two hooks 222, etc.)

The hooking of a panel 20 to the preceding panel is therefore not done using the cables 21 as previously, but using the hooks 22.

Figure 5A:
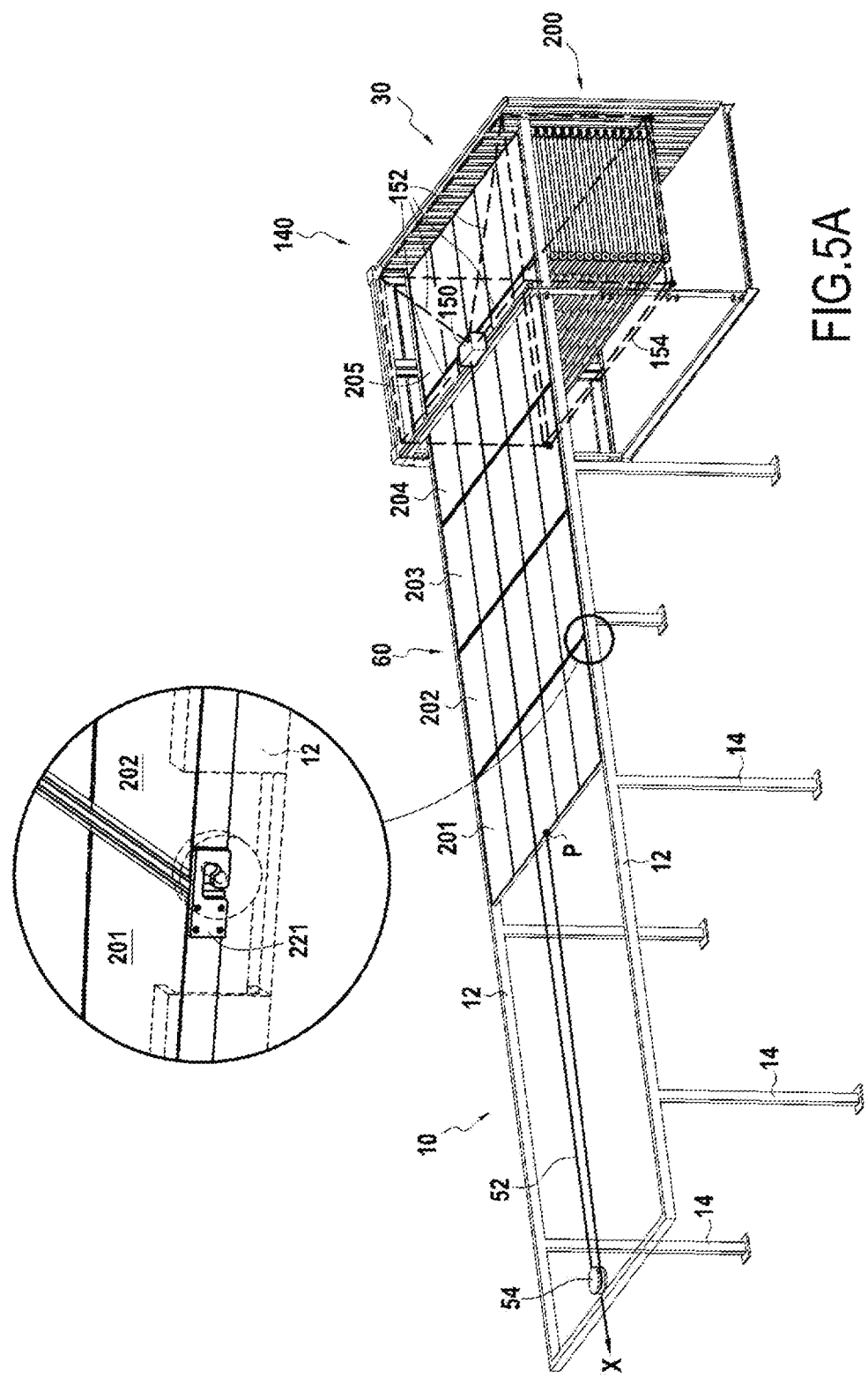
FIG. 5A is a schematic perspective view of a protective structure in the process of being built, in a second mode of implementation of the invention.
Figure 5B:
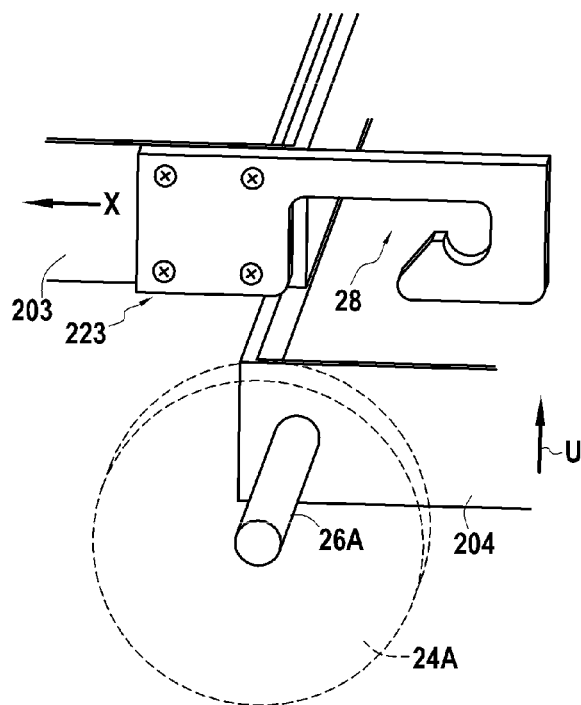
FIGS. 5B, 5C and 5D are schematic partial perspective views of the protective structure in the process of being built shown in FIG. 5A, in three successive steps of the hooking of one panel to a following panel.
Figure 5C:
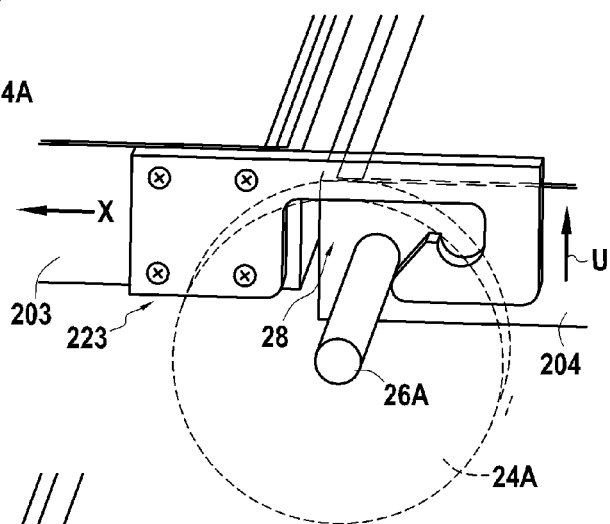
Figure 5D:
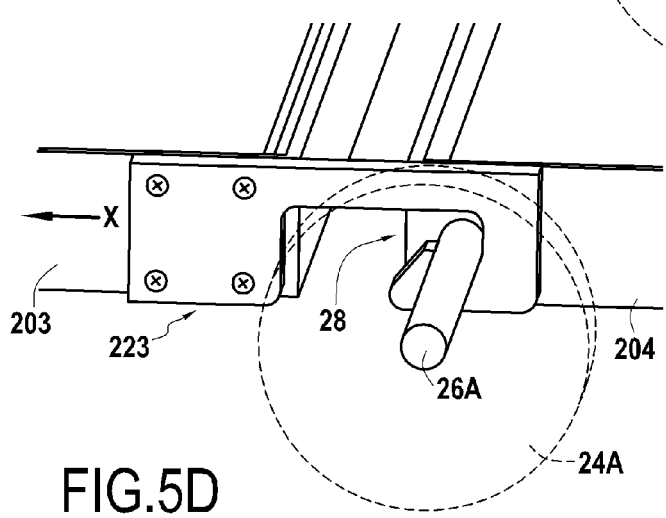

FIGS. 5B, 5C and 5D show three steps of the hooking of the panel 204 to the panel 203. The panel 204 is linked or hooked to the panel 203 at the start of its transfer to the insertion position, using two hooks 223 attached to the panel 203.

On the rear side, each hook 223 has a part in the shape of a hook curved downward; each hook 223 is thus shaped in such a way as to be able to hook onto the shaft 26A of the front wheels 24A of the following panel 204, the shaft 26A passing with this aim through a 'shaft passage' 28 fashioned in the hook 223.

The transfer device 140 used to transfer the panels 20 from the container 30 all the way to their insertion position on the carrying structure 10 is naturally configured to allow this mode of hooking of the panels.

This transfer device 140 includes a hoist 150 as the sole actuator: this hoist first of all serves, as previously, to pull the panels of the panel train 60 along the direction of assembly X using the cable 52, along the direction F; but in addition, the hoist 150, in combination with a set of cables 152 and a tray 154, forms an elevator which makes it possible to lift or hoist the stack of panels 200 upward.

Another special characteristic of this mode of implementation is that the carrying rails 12 extend all the way to the container 30; there are no transfer rails.

The building of the protective structure is done in the following manner.

In a first step a), the carrying structure 10 is built.

Moreover (step b), the stack of panels 200, stored in the container 30, is supplied.

The transfer device is then put in place (step c).

Then in a step d), the panels 20 are transferred from their storage position in the container 30 to a final position on the carrying structure 10.

At the very start of step d), the cable 52 is fastened to the hoist 50 on the front side of the panel 201, passing through the pulley 54.

The following operations are then performed:
the stack of panels 200 is hoisted in such a way as to carry the panel located at the top of the stack, the so-called 'upper panel', at the level of the carrying rails 12.
in the case of the first panel 201, the front wheels 24A thereof are engaged in the carrying rails 12;
for each of the following panels, the rear side of the last panel engaged on the rails is hooked to the front side of the following panel.

This hooking operation is illustrated by FIGS. 5B, 5C and 5D, which show the hooking of a 'second panel', the panel 204, to a 'first panel', the panel 203:
the first panel 203 is slowly drawn forward (along the direction of assembly X) using the hoist 150 until the hooks 223 begin to pass over the front side of the remaining panels in the container.

This location corresponds to the time t1 shown in FIG. 5B.

Simultaneously, the stack of panels 200 is made to rise (rising vertical direction indicated by the arrow U).

These two motions are coordinated such that on each side of the panels 203 and 204, the shaft 26A can engage in the shaft passage 28.

At the time t1 (FIG. 5B), the shaft 26A of the front wheels 22A of the panel 204 arrives just below the opening of the shaft passage 28 fashioned in the hook 223.

The horizontal movement of the panel 203 and the vertical motion of the stack of panels 200 continue such that the shaft 26A becomes engaged in the shaft passage 28. At the time t2 shown in FIG. 5C, the shaft 26A is engaged in the passage 28.

Immediately afterwards, the hoist 150 is disengaged from the cables 152, such that the stack of panels 200 stops rising at the moment the shaft 28 reaches the top of the passage 28.

Conversely, the panel 203 continues to be drawn forward by the cable 52. The shaft 26A therefore is therefore locked behind the passage 28 (FIG. 5D). In this position, the panel 204 is hooked to the panel 203: as the panel train continues to be pulled forward, the panel 204 also moves forward, in such a way as to come to the insertion position on the carrying rails 12, to be incorporated into the panel train. It is then moved on the carrying rails 12 until it reaches its final position.

This procedure is repeated identically for the different panels. The operations of hooking of the different panels (steps c1) are therefore performed successively while the panel train 60 is moved (step c2) in such a way as to transfer all the panels 20 all the way to their final position on the carrying structure 10.

Advantageously in this mode of implementation, the hoist 150 serves to both draw the panel train 60 along the direction of assembly (horizontal movement of the panels) and to lift the stack of panels 200 upward (vertical movement or lifting of the stack of panels).

A special characteristic of this mode of implementation is that the rear side of the panels 20 does not include any supports 22B (of wheels 24B). In the container 30, the panels 20 are only supported by their front supports 22A (with the exception of the last panel naturally).

Thus each panel, with the exception of the last panel, includes only front supports 22A, and no rear supports. The rear side of each panel is therefore configured in such a way as to rest, by way of the hooks 22, on the following panel (which is adjacent). Thus it is the following panel, and more precisely the front supports 22A of the following panel, that provide the holding of the rear side of the panel under consideration along the vertical direction (both upward and downward).

Figure 6:
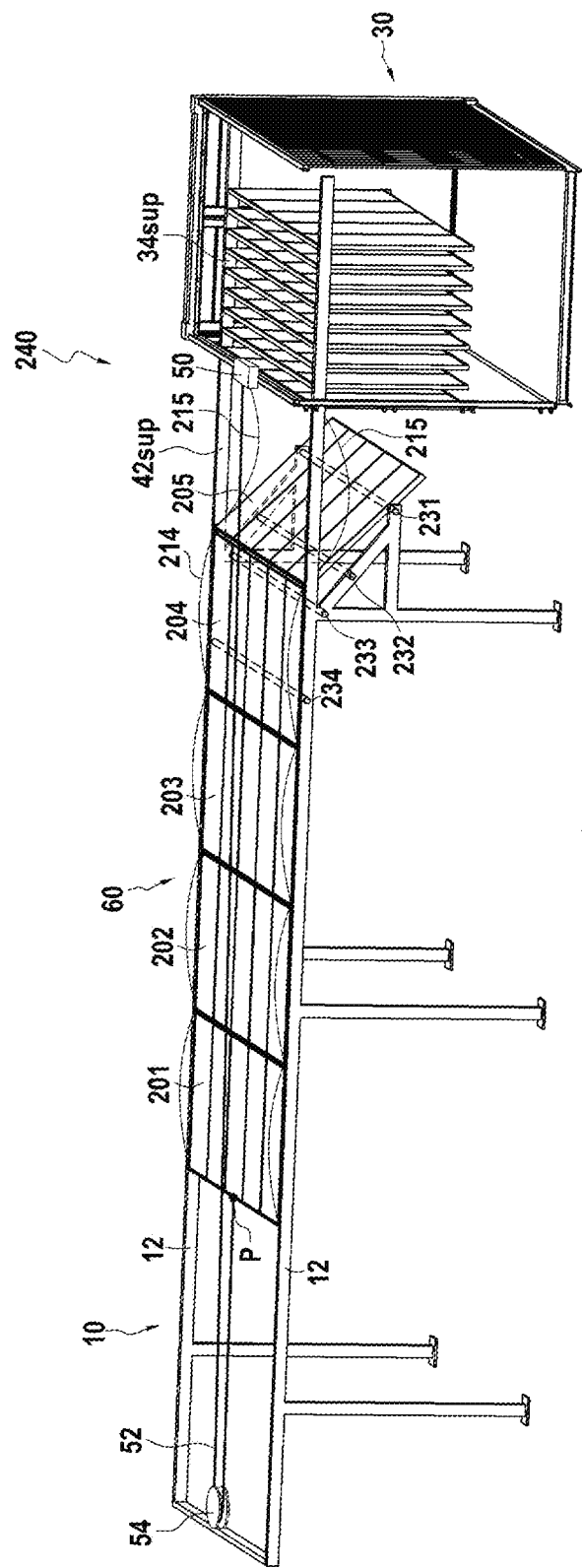
FIG. 6 is a schematic perspective view of a protective structure in the process of being built, in a third mode of implementation of the invention.

The building of a protective structure according to a third mode of implementation will now be presented in relation to FIG. 6. This third mode of implementation is quite similar to the first building mode presented previously. Also, unless otherwise specified, it should be considered that the third mode of implementation is identical to the first mode of implementation.

In this mode of implementation, the panels 20 are stored vertically side by side in the container 30. They are also linked to one another by cables 21 identical to the cables 21 used in the first mode of implementation.

The steps a), b), c) and d) of building the protective structure are substantially identical to the corresponding steps of the first mode of implementation.

The main special characteristic of the third mode of implementation pertains to the transfer device 240 used to move the panels 20 from the container 30 to the carrying structure 10.

Specifically in the first mode of implementation, the transfer device 40 includes ramps 44 which lift the rear wheels 24B of the panels 20. These ramps form a part of the transfer rails which is in the inclined position.

By contrast in the third mode of implementation, the transfer device 240 includes lifting bars 23 which have the purpose of lifting the panels 20 upon their transfer to the insertion position.

These bars (collectively, the bars 23) are individually referenced as bar 231, bar 232, bar 233 and bar 234, following the order wherein they interact with a panel to lift it gradually, when the protective structure is assembled.

These bars 23 form bearings secured to the carrying structure 10 and are in practice attached to the carrying structure 10.

These are horizontal bars, perpendicular to the direction of assembly, and which are disposed at increasing heights on the front side of the container 30.

The heights of the bars 23 are set such that during step c1), the panels come successively into contact with the bars 231, 232, 233 and 234, which obliges the panel or panels 20 in the process of being transferred to lift.

FIG. 6 shows an intermediate position reached by the panel 204 during its transfer onto the carrying structure.

This transfer happens as follows.

The transfer of the panel 205 (by way of example of a panel) begins when the cables 214 of the panel 204 are tautened. The panel 205 is then drawn by the panel 204, itself incorporated into the panel train 60 and drawn by the hoist 50. The front side of the panel 205 is drawn forward; its front wheels 24A roll on the storage rails 34sup then on the transfer rails 42sup then on the carrying rails 12.

At a certain time, the panel 205 comes into contact with the first lifting bar 231, which is the lowest. As the front side of the panel 204 continues to progress forward (direction of assembly X) the panel 205 is therefore obliged to lift.

When the movement of the front side 204 continues, the panel 205 then comes successively into contact with the lifting bars 232, 233 and 234, which obliges it to lift more and more, until it finally reaches the horizontal position; the front and rear wheels of the panel 205 are then bearing in the wheel passages 14 and 15, and the panel 205 is in the insertion position.

In the course of this movement, the panel 205 pivots. The position of the insertion openings 16 on the transfer rails 42sup is disposed such that the rear wheels 24B of the panel 205 (or of the other panels) during the transfer can enter into the wheel passages 14, as in the first mode of implementation.

In the first as in the third mode of implementation, it is the reaction force applied to the panels by bearings secured to the structure (ramps 44 and lifting bars 23 respectively) which causes the panels 20 to lift and reach the insertion position. Naturally, these bearings can take many forms as shown by the examples of the first and the third modes of implementation.

Figure 7:
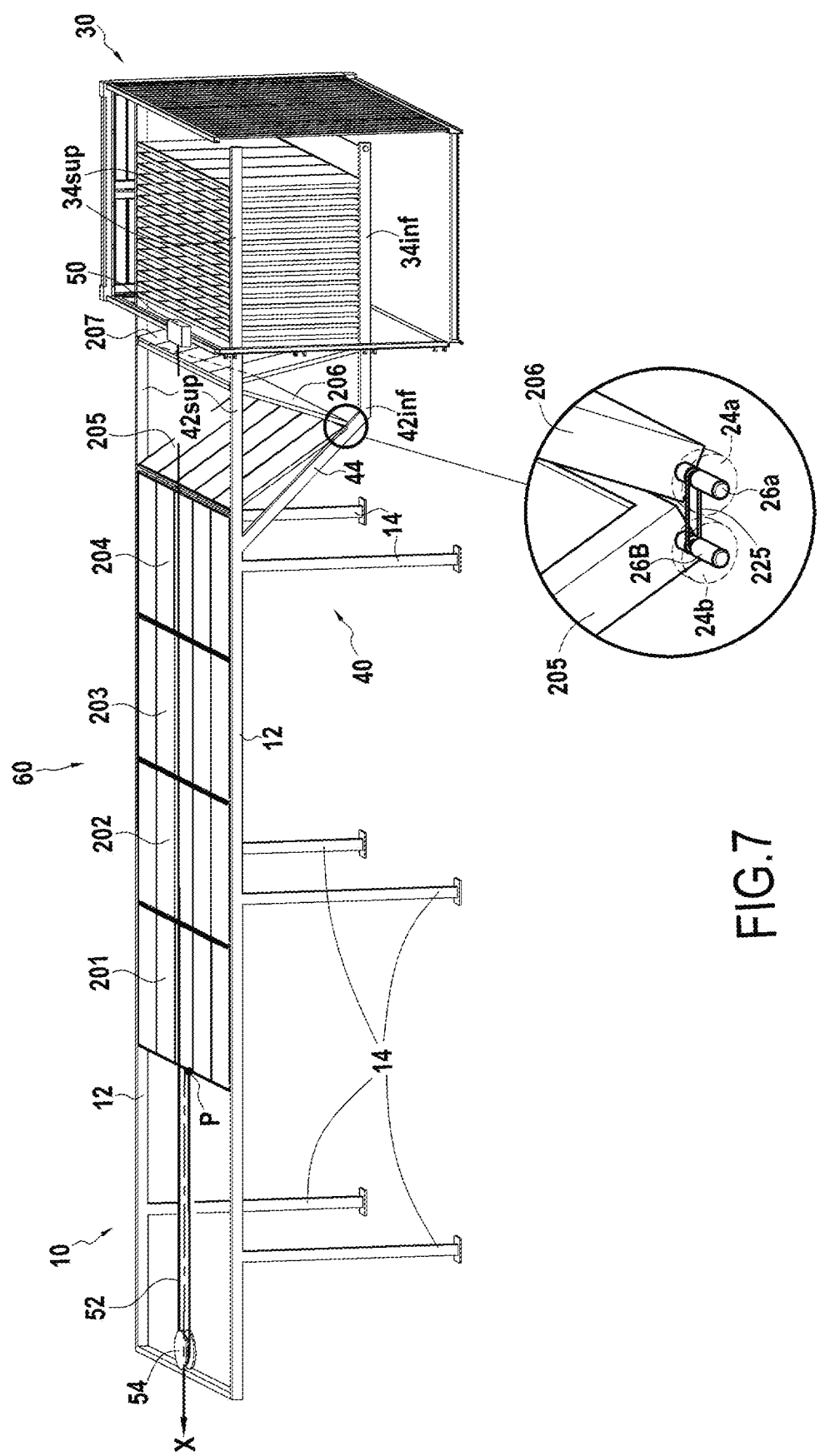
FIG. 7 is a schematic perspective view of a protective structure in the process of being built, in a fourth mode of implementation of the invention.

The building of a protective structure according to a fourth mode of implementation will now be presented in relation to FIG. 7. This fourth mode of implementation is for the most part similar to the first building mode presented previously. Hence, unless otherwise specified, it should be considered that the fourth mode of implementation is identical to the first mode of implementation.

In this mode of implementation, the panels 20 are stored vertically side by side in the container 30.

Moreover, unlike the preceding embodiments, they are linked to one another, even in the storage position. More specifically, for each panel, the rear side of the panel is linked to the front side of the following panel. The panels are thus linked in a 'zig-zag' formation in the container 30.

Consequently during the building of the protective structure, when a panel is placed bearing on the carrying rails 12 and incorporated into the panel train, and when it is drawn forward, it drags after it the following panel, which itself drags the following panel, and so on (See FIG. 7).

The link can be made by any means. In the proposed example, each panel 20 is identical to the panels 20 of the first embodiment; it therefore includes supports 22A and 22B identical to the supports 22A and 22B of the panels used in the first mode of implementation, and shown in FIGS. 2 and 3.

When they are transferred, the panels 20 are held and lifted by their front 24A and rear 24B wheels in substantially the same way as in the first mode of implementation:

On the upper side, the front wheels 24A roll successively bearing on the storage rails 34sup, then the transfer rails 42sup, then the carrying rails 12; on the lower side, the rear wheels 24B roll bearing on the lower storage rails 34inf, the lower transfer rails 42inf, the ramps 44, and then the carrying rails 12.

In the course of this motion it can occur that the wheels of certain panels are temporarily lifted above the transfer rails 42inf, the panels of which these wheels are a part then being supported only by their wheels bearing on the upper transfer rails 42sup; but be that as it may, the presence of the ramps 44 guarantees that the panels reach the insertion position, with engagement of their rear wheels on the transfer rails 42sup.

A detail view in FIG. 7 shows a part of the lower end of the panels 205 and 206.

As long as the panels 205 and 206 are not disposed substantially in the same plane, each of the rear wheels 24B of the panel 205 is in contact with a corresponding front wheel 24A of the panel 206. The shafts 26B and 26B respectively of these two wheels are linked to one another by a link 225. (Any other linking device, preferably non-extensible, could be suitable, for example a hook linking the shaft 26A of the panel 206 to the shaft 26B of the panel 205, etc.).

Owing to the links 225, when the panel 205 is transferred toward its insertion position, then toward its final position, it drags the panel 206 after it.

The building of a protective structure according to a fifth mode of implementation of the invention will now be presented in relation to FIGS. 8A to 8C.

This embodiment is identical to the first embodiment (FIGS. 1A to 1E), with the exception of the differences explained below.

In the first embodiment, the transfer device comprises inclined ramps 44. During the transfer of the different panels, the rear wheels 24B of the panels take bearing on these ramps 44, which obliges the panels to lift.

In the fifth mode of implementation, the transfer device 440 differs from the transfer device 40 in that it does not include any inclined ramps 44. Instead, on each upper transfer rail (42sup) is assembled a mast 46. On this mast is assembled a double-groove pulley 47. Two identical slings 48A and 48B are used in association with the pulley 47, in the manner indicated by FIGS. 8A-8C:

During the transfer, for example, of a first panel 201 (FIG. 8A), the ends of one of these slings (the cable 48A) have been previously attached to the front and rear sides of this first panel; for example, to the shafts 26A,26B of the wheels 24A,24B. (The same operations are performed on the left and the right side of the panels). The sling 48A therefore has a first strand 48A1 located between the pulley 47 and the front side of the panel 201, and a rear strand 48A2 conversely located between the pulley 47 and the rear side of the panel 201.

In parallel, the ends of the other sling (sling 48B) have been previously attached to the front and rear sides of the second panel 202, in the same way as the first sling 48A.

As in the first embodiment, the panel 201 is drawn forward, i.e. along the direction of assembly, by the cable 52. Under the effect of this pull, its front wheels engaged on the carrying rails 12 move forward by rolling horizontally on these rails. Thus, the front end of the sling 48A linked to the front of the panel 201 moves forward, which increases the length of the front strand 48A1 and conversely reduces the length of the rear strand 48A2. This change obliges the rear of the panel 201 to rise, while moving forward. After this motion (FIG. 8B), the panel 201 has reached a horizontal position, which is the insertion position, wherein the rear wheels 24B engage on the carrying rails 12. The sling 48A is then detached from the panel 201 and attached to the third panel 203.

At the same time, the second panel 202 is drawn forward by the cable 211. Like the first panel, while the front wheels 24A of the second panel 202 roll forward on the rails 12, the rear of the second panel gradually lifts under the effect of the pull that is applied to it by the rear strand 4862 of the sling 48B (FIG. 8C). In the subsequent step (not shown), after this lifting motion the panel 202 reaches the insertion position; the sling 48B is detached.

These operations are executed successively until all the panels have been placed in the final position on the rails 12.

In the different modes of implementation presented, the panels 20 are photovoltaic panels. To implement photovoltaic panels, these must naturally then be electrically connected to an electricity conditioning and/or storage facility.

Moreover, the invention can naturally be implemented with all types of panels, in particular panels without photovoltaic modules.

The putting in place of the panels according to the invention generally forms only the first phase of the building of the protective structure. The building of the protective structure generally includes other subsequent fit-out steps, for example:

Installing seals or other means between the panels, or putting a tarpaulin in place under the panels, to seal the roof formed by the panels;

Installing or producing vertical walls on the sides of the carrying structure, in order to close the internal space fashioned under the panels.

Although in the modes of implementation presented, the pulling force applied to the panel train is applied by a hoist, other means can be used. For example, the panel train can be moved, and in particular pulled, by a truck or an agricultural tractor.

The invention claimed is:

1. A system for building a protective structure, comprising:
   a container comprising storage rails;
   a group of panels disposed parallel to one another in a storage position in the container, bearing on said storage rails, the panels being disposed vertically side by side in the storage position;
   a set of components configured to build a carrying structure including a plurality of parallel carrying rails, and a transfer device which includes transfer rails;
   the transfer device being configured to be put in place in such a manner that the transfer rails directly link the storage rails to the carrying rails; and
   the panels and the carrying structure being configured such that the panels are engaged on the carrying rails and supported by the carrying rails, and then slide along the carrying rails along a direction of assembly; and
   wherein the panels are transferred from the storage position to a final position wherein all of said panels are supported by the carrying rails, by performing the following operations in such a way as to transfer all the panels:
   d1) transfer of at least one of the panels from the storage position to an insertion position wherein said at least one panel is bearing on the carrying rails;
   the transfer being performed using the transfer device lifting said at least one of the panels upward;
   the transferred panels being placed one after the other bearing on the carrying rails; and
   d2) movement of at least one panel along the carrying rails along the direction of assembly;
   wherein, in the storage position, front sides of the panels are disposed on an upper side of the group of panels, a respective said front side of a respective said panel being a side of the panel which is at front of the panel during transfer of the panel from the storage position to the final position;
   during the transfer of said at least one panel from the storage position to the final position, said at least one panel moves while being continuously supported successively by the storage rails, the transfer rails and the carrying rails;
   the transfer device includes a bearing secured to the structure; and
   during the transfer of said panels from the storage position to the final position, said panels come into contact with said bearing which forces said panels to rotate and to be lifted.

2. The system as claimed in claim 1, wherein at least one of the panels is a photovoltaic panel.

3. The system as claimed in claim 1, wherein the protective structure is built from a kit.

4. A system for building a protective structure, comprising:
   a container comprising storage rails;
   a group of panels disposed vertically parallel to one another in a storage position in the container, bearing on said storage rails;
   a set of components configured to build a carrying structure including a plurality of parallel carrying rails, and a transfer device which includes transfer rails;
   the transfer device being configured to be put in place in such a manner that the transfer rails directly link the storage rails to the carrying rails; and
   the panels and the carrying structure being configured such that the panels are engaged on the carrying rails and supported by the carrying rails, and then slide along the carrying rails along a direction of assembly; and
   wherein the panels are transferred from the storage position to a final position wherein all of said panels are supported by the carrying rails, by performing the following operations in such a way as to transfer all the panels:
   d1) transfer of at least one of the panels from the storage position to an insertion position wherein said at least one panel is bearing on the carrying rails;
   the transfer being performed using the transfer device lifting said at least one of the panels upward;
   the transferred panels being placed one after the other bearing on the carrying rails; and d2) movement of at least one panel along the carrying rails along the direction of assembly;

during the transfer of said at least one panel from the storage position to the final position, said at least one panel moves while being continuously supported successively by the storage rails, the transfer rails and the carrying rails; and said at least one panel is of rectangular shape; and in one or more of the insertion position and the final position, or else continuously during a movement of said at least one panel in step d2) from the insertion position to the final position, each angle of said at least one panel rests directly or indirectly on the carrying rails via at least one bearing point located at a short distance from the angle under consideration and is disposed under a fly-off prevention part of a respective said carrying rail to prevent the panel from flying off of the respective carrying rail during windy conditions.

5. The system as claimed in claim 4, wherein at least one of the panels is a photovoltaic panel.

6. The system as claimed in claim 4, wherein the protective structure is built from a kit.

7. A method of building a protective structure, comprising the following steps:
  a) providing a carrying structure, including a plurality of parallel carrying rails;
  b) providing a group of panels, stored parallel to one another in a container, in a storage position;
  the panels bearing, in the storage position, on storage rails of said container, the panels being disposed vertically side by side in the storage position;
  the panels and the carrying structure being configured such that the panels are engaged on the carrying rails and supported by the carrying rails, and then slide along the carrying rails along a direction of assembly;
  c) providing a transfer device which includes transfer rails that are put in place;
  while the transfer device is being put in place, the transfer rails are disposed such that the transfer rails directly link the storage rails to the carrying rails; and
  d) transferring the panels from the storage position to a final position wherein all of said panels are supported by the carrying rails, by performing the following operations in such a way as to transfer all the panels:
  d1) at least one of the panels is transferred from the storage position to an insertion position wherein said at least one panel is bearing on the carrying rails;
  the transfer being performed using the transfer device lifting said at least one of the panels upward;
  the transferred panels being placed one after the other bearing on the carrying rails; and
  d2) at least one panel is moved along the carrying rails along the direction of assembly; and wherein,
  in the storage position, front sides of the panels are disposed on an upper side of the group of panels, a respective said front side of a respective said panel being a side of the panel which is at front of the panel during transfer of the panel from the storage position to the final position;
  during the transfer of said panels from the storage position to the final position, said panels are moved while being continuously supported successively by the storage rails, the transfer rails and the carrying rails;
  the transfer device includes a bearing secured to the structure; and
  during the transfer of said panels from the storage position to the final position, said panels come into contact with said bearing which forces said panels to rotate and to be lifted.

8. The building method as claimed in claim 7, wherein said at least one panel is of rectangular shape; and in one or more of the insertion position and the final position, or else continuously during a movement of said at least one panel in step d2) from the insertion position to the final position, each angle of said at least one panel rests directly or indirectly on the carrying rails via at least one bearing point located at a short distance from the angle under consideration.

9. The building method as claimed in claim 7, wherein, in the final position, one or more of a front side and a rear side of said at least one panel is/are bearing on the carrying rails, without said at least one panel bearing, even partly, on the side(s) under consideration, on an adjacent panel.

10. The building method as claimed in claim 7, wherein, in the final position, one or more of a front side and a rear side of said at least one panel is/are bearing on the carrying rails via one or more adjacent panels.

11. The building method as claimed in claim 7, wherein the carrying rails extend along a horizontal direction.

12. The building method as claimed in claim 7, wherein while the transfer device is being put in place in step d), the transfer rails, or part of the transfer rails, is/are in an inclined position.

13. The building method as claimed in claim 7, wherein during the step d1) of transfer from the storage position to the insertion position, all the panels make a motion consisting in an initial motion of placement in an initial position, then a main motion from the initial position to the insertion position; the initial motion from the storage position to the initial position being either a translation or a rotation, and the main motion being the same for all the panels.

14. The building method as claimed in claim 7, wherein in step d2), said at least one panel is moved along the carrying rails such that said at least one panel makes a translation along the direction of assembly.

15. The building method as claimed in claim 7, wherein a front side of a first panel or a rear side of a panel placed on the carrying rails in front of the first panel is hooked to a front side of a second panel intended to be engaged on the carrying rails following the first panel, during the transfer and at latest after the transfer of the first panel.

16. The building method as claimed in claim 7, wherein in step d), during the transfer of a first panel, a rear side of a first panel is made to pass near to a front side of a second panel intended to be engaged on the carrying rails following the first panel, and a rear half of the first panel is linked to a front side of the second panel.

17. The building method as claimed in claim 7, wherein a front or rear side of at least one panel includes holding supports, configured such that, when a panel is engaged on the carrying rails, one or more of said front side and rear side of the panel thus engaged is held by said holding supports; the holding supports engaging the carrying rails in such a way as to prevent a relative motion of one or more said front side and said rear side of the panel thus engaged with respect to the carrying rails in one or more of a downward and upward direction.

18. The building method as claimed in claim 7, wherein in one or more of the insertion position and the final position, or else continuously during the movement of said at least one panel in step d2) from the insertion position to the final position, a part of said at least one panel is disposed under a fly-off prevention part of a carrying rail.

19. The building method as claimed in claim 7, wherein said carrying rails are profiles of constant section.

20. The building method as claimed in claim 7, wherein said bearing includes at least two inclined ramps; a front or rear side of at least one panel includes at least two supports; the panel and the ramps are configured such that during the transfer of the panel, said at least two supports of the panel respectively bear on said at least two ramps, thus forcing the panel to be lifted.

21. The building method as claimed in claim 7, wherein the transfer device includes an elevator, configured to lift the stack of panels.

* * * * *